Figure 1:
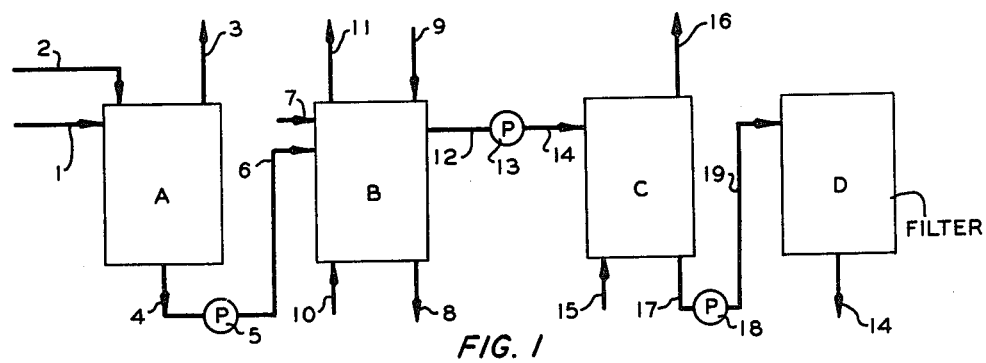

March 23, 1965 P. F. WARNER ETAL 3,174,989
PROCESS FOR PRODUCTION OF TRIALKYL TRITHIOPHOSPHITES
AND TRIALKYL TRITHIOPHOSPHATES
Filed July 13, 1962

INVENTORS
P. F. WARNER
J. R. SLAGLE
R. W. MEAD
BY
Young - Quigg
ATTORNEYS

United States Patent Office 3,174,989
Patented Mar. 23, 1965

3,174,989
PROCESS FOR PRODUCTION OF TRIALKYL TRITHIOPHOSPHITES AND TRIALKYL TRITHIOPHOSPHATES
Paul F. Warner, Phillips, and James R. Slagle, Houston, Tex., and Richard W. Mead, Denver, Colo., assignors to Phillips Petroleum Company, a corporation of Delaware
Filed July 13, 1962, Ser. No. 209,714
10 Claims. (Cl. 260—461)

This invention relates to trialkyl trithiophosphites. Further, this invention relates to trialkyl trithiophosphates. In one of its aspects, the invention relates to a process for the production of a trialkyl trithiophosphite or a trialkyl trithiophosphate. In another of its aspects, the invention relates to an apparatus for the production of a trialkyl trithiophosphite or a trialkyl trithiophosphate.

In one of its inventive concepts, the invention provides a process for the production of an S,S,S-trialkyl trithiophosphate by reaction of a corresponding mercaptan and phosphorus trihalide, with evolution of hydrogen chloride, completion of the reaction as far as it will go by further heating, then adding a base such as sodium carbonate, pyridine, etc., in an amount sufficient to combine with residual hydrogen chloride and phospho-halides found remaining in the reaction mass, and then aerating or oxidizing the reaction mass thus obtained to convert the S,S,S-trialkyl trithiophosphite therein contained to S,S,S-trialkyl trithiophosphate. In another of its inventive concepts, the invention provides apparatus or means wherein a method for handling of the reactants and reaction masses to produce the final product can be practiced with improved results. In a further inventive concept of the invention, there is provided improved end product production of a trialkyl trithiophosphite by first causing all reaction possible between an alkyl mercaptan and a phosphorous trihalide and then treating the reaction mass with a base.

The reactions involved in making S,S,S-tri-n-butyl trithiophosphate are illustrated by the following equations:

(1) 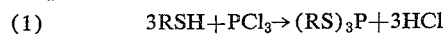   $3RSH + PCl_3 \rightarrow (RS)_3P + 3HCl$ (2) 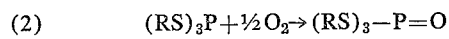   $(RS)_3P + \tfrac{1}{2} O_2 \rightarrow (RS)_3{-}P{=}O$ The reaction of phosphorous trihalide with alkyl mercaptans to produce the corresponding trithiophosphites has been known. The trialkyl trithiophosphites are generally colorless oils, insoluble in water, but quite soluble in usual organic solvents. They are known to be readily oxidizable by air.

It has been known to provide an acid acceptor, such as dimethyl aniline or pyridine or sodium bicarbonate, sodium carbonate, and the like, to serve during the reaction as it is conducted. Stoichiometric amounts of the acid acceptor had been used.

We have now discovered that, by first effecting the reaction between a phosphorous trihalide, such as phosphorous trichloride, and an alkyl mercaptan, such as n-butyl mercaptan, and heating for an extended time sufficient to cause evolution of hydrogen chloride as far as this is possible to occur, there remains in the reaction mixture a relatively small residual amount of hydrogen chloride and some phospho-halides or by-product. We have further found that the presence of these materials hinders the ensuing oxidation step not only by extending it with respect to time but also with respect to the purity of product utimately obtained.

We have also found that, by adding to the reaction mixture, which has been heated to evolve as much hydrogen chloride therefrom as is possible to obtain by heating, a base such as herein described and then conducting the oxidation, several advantages are obtained. First, a considerably reduced amount of base only needs to be added. Secondly, the ensuing oxidation to the corresponding phosphate is more rapidly accomplished, and, thirdly, the purity of the phosphate obtained is in excess of 99 percent and, therefore, considerably better than can be obtained with operations heretofore conducted.

It is evident from the foregoing discussion that we have, in effect, found that considerably less than the stoichiometric quantities of base, calculated according to the above reactions, can be used. This results in advantages herein set forth including the further advantages of savings of time, expense of the base, and equipment for handling the same.

It is an object of this invention to provide a process for the production of trialkyl trithiophosphates. It is another object of this invention to provide an apparatus wherein a method for the production of trialkyl trithiophosphates can be practiced. It is a further object of this invention to reduce the quantity of base required in the production of trialkyl trithiophosphates. It is a further object of the invention to provide a process for producing trialkyl trithiophosphates in less time than required heretofore. It is a further object of the invention to provide a process for the production of trialkyl trithiophosphates of purity substantially greater than that heretofore obtainable, indeed, of purities exceeding 99 percent. It is a still further object of the invention to produce a trialkyl trithiophosphite employing less base than heretofore thought required to obtain essentially only trithiophosphite as end product.

Other aspects, objects and the several advantages of the invention are apparent from a study of this disclosure, the drawing and the appended claims.

According to the present invention, a phosphorous trihalide and an alkyl mercaptain are caused to react with evolution of hydrogen chloride and the reaction mass heated to evolve all hydrogen chloride which can be evolved. Then there is added to the reaction mass a base, as herein described, in an amount only sufficient to react with phosphochlorides and residual hydrogen chloride found in the reaction mass. This produces a trialkyl trithiophosphite of improved purity with less use of base than heretofore required.

Also, according to the present invention, trialkyl trithiophosphite thus obtained is oxidized, for example, by aeration, to produce trialkyl trithiophosphate in a time shorter than heretofore required and of impurity considerably greater than heretofore obtained.

The invention is applicable to the production of S,S,S-tri-n-butyl trithiophosphate and will, therefore, be described in connection with n-butyl mercaptan and phosphorous trichloride reactants.

Generally, the reaction mixture composed of n-butyl mercaptan and added phosphorous trichloride is heated to remove hydrogen chloride as it is formed but, even with a final reaction temperature of 300° F., it is found that 5–7 percent, approximately, of the stoichiometric amount of hydrogen chloride has not been evolved. Even when the mol ratio of mercaptan to phosphorous halide was as high as 5 and the reaction mixture was heated to reflux for some time, 2 percent of HCl was retained by the reaction mixture. According to the invention, there is added at this juncture enough base, for example, a mild or weak base such as sodium carbonate, pyridine, dimethyl aniline or other similar base which will function to react with the residual hydrogen chloride and any phospho-chlorides present, the amount of base being added being substantially less than the stoichiometric amount as calculated according to the above reaction and being in the approximate range of 5–15 percent, preferably only 5–10 percent of the stoichiometric amount indicated by said reaction.

Upon addition of the base, which can be added to neutralize only the residual HCl remaining in the reaction mixture at the completion of the reaction, the oxidation of the phosphite to phosphate with air goes considerably faster. The oxidation will go to completion. As indicated, purities in excess of 99 percent are obtained without difficulty. These purity values, without addition of base, usually run 89–92 weight percent. Yield of phosphate is at least 95 mol percent based on the phosphorous trihalide or trichloride.

It is within the scope of the invention to heat the phosphite-base mixture after addition of the base.

It is especially noteworthy, at this point, that the final purities are obtained without a water wash.

The following tabulation illustrates that the intermediate addition of the carbonate or other base permits improved results as herein set forth. In Run 1 in which no base was used, the maximum phosphate content after the oxidation step was only 91.9 percent at the end of 6 hours. With addition of base after the initial reaction step to form the phosphite, the phosphate content upon oxidation was in excess of 99 percent in 5 and 4 hours, respectively, for Runs 2 and 3, i.e., 99.6 percent and 99.3 percent, respectively. Purities of 99.6 percent and 99.7 percent were obtained in these runs without water wash. The considerable speeding up of the oxidation reaction by practice of the combination of steps of the present invention provides significant improvement in the art in which considerable quantities of S,S,S-tri-n-butyl trithiophosphate is produced for use, among other uses to which it may be put, as a cotton defoliant on a large scale.

| Run | 1 | 2 | 3 |
|---|---|---|---|
| Base added | None | Pyridine | Na₂CO₃ |
| Weight percent | | 3.4 | 2.6 |
| Phosphate Content, weight percent | | | |
| Oxidation Time, Hours: | | | |
| 1 | 76 | 94.8 | 79.1 |
| 2 | 83.5 | | 95.8 |
| 3 | | 98.6 | |
| 4 | 85.5 | | 99.2 |
| 5 | | 99.6 | |
| 6 | 91.9 | | 99.7 |

As already indicated, it is seen from the foregoing experimental data that two advantages accrue from use of the present invention.

The oxidation is effected considerably faster and can be made to proceed substantially to completion.

The final purity is high enough that the need for a water wash is completely eliminated.

The broad and now preferred ranges of conditions for the reactions are as follows:

| | Broad Range | Preferred Range |
|---|---|---|
| Preparation of Alkyl Trithiophosphite: | | |
| Temperature | 80–350° F | 100–300° F. |
| Pressure | 400–760 mm. Hg | Atmospheric. |
| Time | 2–10 hours | 6–8 hours. |
| Oxidation of Alkyl Trithiophosphite: | | |
| Temperature | 200–300° F | 230° F. |
| Pressure | Atmospheric-20 p.s.i.g. | Atmospheric. |
| Time | 2–36 hours | 10–18 hours. |

Further, in Run 2, the pyridine was added with stirring to the crude phosphite at room temperature. The temperature rose to 150° F. during the addition.

Still further, in Run 3, the dry sodium carbonate was added in 8 portions to the stirred reaction mixture at 200° F. The temperature rose to 278° F. during the addition. The sodium carbonate was simply scooped in, since there was no foaming.

The following is an example of operation according to the invention.

PREPARATION OF TRI-n-BUTYL TRITHIOPHOSPHITE BY IMPROVED METHOD

Charge:
- 12.8 mols (1,155 g.) n-butyl mercaptan
- 4.0 mols (550 g.) phosphorous trichloride
- 0.6 mol (48 g.) pyridine (after main reaction)
- 13.0 mols { 520 g. sodium hydroxide / 3,602 g. water } for HCl trap

*Procedure*

STEP 1

The mercaptan was charged to a 3-liter 3-necked creased reactor equipped with a reflux condenser, stirrer, thermometer, and dropping funnel. Phosphorous trichloride was added as indicated. HCl vapors were passed through the reflux condenser (0° F.) then into the caustic solution in the HCl trap.

| Time | Temp., °F. | PCl₃, added, g. | Wt. of HCl trap, g. | Remarks |
|---|---|---|---|---|
| 9:34 A.M. | 95 | 158 | 5,379.0 | |
| 10:00 | 96 | 193 | 5,379.0 | |
| 10:30 | 96 | 316 | 5,380.0 | 1st reflux at 10:15. |
| 11:00 | 96 | 316 | 5,408.0 | |
| 11:30 | 111 | 316 | 5,457.8 | |
| 12:00 | 103 | 316 | | |
| 1:00 P.M. | 88 | 316 | 5,537.9 | |
| 1:30 | 100 | 386 | 5,569.8 | |
| 2:00 | 98 | 550 | 5,591.1 | |
| 2:30 | 128 | 550 | 5,637.5 | |
| 3:00 | 188 | 550 | 5,712.0 | |
| 3:30 | 241 | 550 | 5,767.9 | |
| 4:00 | 280 | 550 | 5,789.0 | |
| 4:15 | 302 | 550 | 5,794.0 | |
| 4:35 | 304 | 550 | 5,796.0 | 95% of theo. HCl accounted for. |

STEP 2

After cooling to room temperature, 48 g. of pyridine were added. The mixture warmed up to 150° F. during the addition. Heat was applied, and the temperature was kept at 244° F. for a few minutes. The mixture was then allowed to cool.

G.
Weight of crude phosphite [1] _____ 1230.8
Weight of pyridine hydrochloride _____ [2] 63.0

[1] Containing 5% weight HCl.
[2] Recovered by filtration.

STEP 3

| | Grams | Mol Percent |
|---|---|---|
| A. Charge—Crude Phosphite Air (Rate: Stoichiometric Amount/hr.) | 1,231 | |
| B. Products—Phosphate [1] | 1,200 | 95.4 |

[1] Phosphate purity 99 weight percent.

Figure 2:
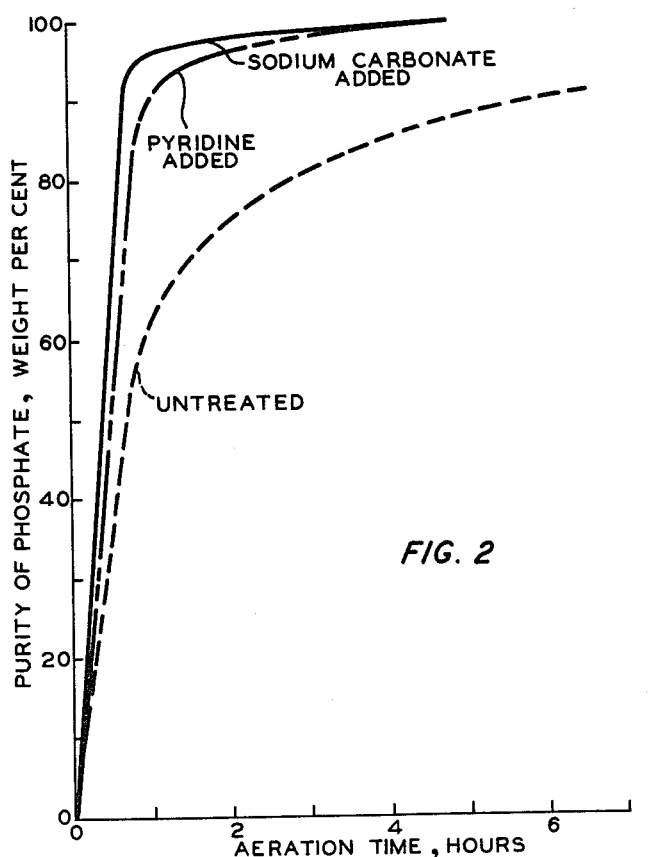

Referring now to the drawing, FIGURE 1 is a diagrammatic showing of an apparatus wherein a method of the invention can be practiced. FIGURE 2 shows in graphed manner data which have been obtained by operating according to the invention with and without addition of a base. It is noteworthy that, with the addition of sodium carbonate, or pyridine, the purity with respect to aeration time was considerably increased, a purity of approximately 95 percent having been obtained in about 1 hour with sodium carbonate and in about 1½ hours with pyridine, both purities being considerably in excess of that obtained upon oxidation of the untreated phosphite even after 6 hours.

Referring now to FIGURE 1 of the drawing, to n-butyl mercaptan in zone A, introduced thereto by 1, there is added phosphorous trichloride by 2. Reaction occurs and hydrogen chloride evolved is taken off at 3. After heating to effect the maximum removal of vapors of HCl, the reaction mass is withdrawn by 4 and pumped by pump 5 and 6 into zone B.

In zone B, sodium carbonate is added by 9 and air is then introduced at 10 and lean air removed at 11 and sent to a scrubber not shown. Oxidized product phosphate is passed by 12, pump 13 and 14 into zone C for drying, air being blown into C by 15 and removed with water vapor at 16. Crude phosphate is passed by 17, pump 18 and by 19 to zone D wherein it is filtered. The product is an oily substance. Upon filtration, it is ready for use as may be desired.

The phosphorus trihalides which can be used, according to the invention, include phosphorous trichloride, phosphorous tribromide and phosphorous triiodide, and preferably the trichloride.

The alkyl mercaptans which can be used in the preparation of trialkyl trithiophosphites or trithiophosphates, according to the invention, include an alkyl mercaptan having 3, 4 or 5 carbon atoms per molecule, or a mixture of two or more of these mercaptans.

Reasonable variation and modification are possible within the scope of the foregoing disclosure, drawing and appended claims to the invention the essence of which is that an improved process in production of a trialkyl trithiophosphite or a trialkyl trithiophosphate has been provided by causing reaction of an alkyl mercaptan and a phosphorous halide to go to completion as far as possible with extended heating until no further evolution of hydrogen chloride is obtained and to then add a material or base only in quantity essentially sufficient to react with any residual hydrogen halide and any phospho-halide in the reaction mass, in the case of phosphate production, followed by oxidation of the thus treated phosphite containing reaction mass; and that a method and apparatus for effecting the process of the invention have been set forth, substantially as described.

We claim:

1. A process for the production of S,S,S-tri-n-butyl trithiophosphate of improved purity which comprises effecting a reaction between n-butyl mercaptan and phosphorous trichloride with evolution of hydrogen chloride formed in the reaction, heating the reaction mass to evolve a further quantity of hydrogen chloride, then adding a base in an amount in the range of 5-15 percent of the stoichiometric amount calculated according to the reaction $3RSH+PCl_3 \rightarrow (RS)_3P+3HCl$ to react with the residual hydrogen chloride and any phospho-chloride by-products in the reaction mass, then oxidizing the reaction product thus obtained and recovering S,S,S-tri-n-butyl trithiophosphate.

2. A process according to claim 1 wherein the base is selected from the group consisting of pyridine, sodium carbonate, sodium bicarbonate and dimethyl aniline.

3. A process for the production of S,S,S-tri-n-butyl trithiophosphate which comprises bringing together, in a first reaction zone under conditions to effect reaction between them with evolution of hydrogen chloride, n-butyl mercaptan and phosphorous trichloride, heating the reaction mass to substantially complete evolution of hydrogen chloride, then transferring the reaction mass into a second reaction zone, in said second reaction zone admixing with the reaction mass a quantity of base sufficient to react with residual HCl and any phospho-chloride therein, oxidizing in said second reaction zone a crude phosphite product thus obtained and recovering from said last-mentioned reaction zone S,S,S-tri-n-butyl trithiophosphate.

4. A process for the production of S,S,S-tri-n-butyl trithiophosphate which comprises bringing together, in a first reaction zone under conditions effecting reaction between them with evolution of hydrogen chloride, n-butyl mercaptan and phosphorous trichloride, heating the reaction mass to substantially complete evolution of hydrogen chloride, then transferring the reaction mass into a second reaction zone, in said second reaction zone admixing with the reaction mass a quantity of base sufficient to react with residual HCl and any phospho-chloride therein, maintaining in said second reaction, for a time sufficient to complete reaction of the added base with residual HCl and chlorine containing by-products, a temperature effective to complete said reaction, then oxidizing the thus treated reaction mass to convert S,S,S-tri-n-butyl trithiophosphite to the corresponding phosphate and recovering said phosphate.

5. A process for the production of S,S,S-tri-n-butyl trithiophosphate which comprises adding phosphorous trichloride to n-butyl mercaptan under conditions to effect the reaction therebetween to form S,S,S-tri-n-butyl trithiophosphite, heating the reaction mass thus obtained to a temperature in the range 80-350° F. and at a pressure in the range 400-760 mm. Hg and for a time sufficient to remove substantially all hydrogen chloride vapors which can be evolved therefrom by further reaction in said mass, then adding to said mass a base effective to combine with residual HCl and chlorine containing by-product in said mass, heating the mass to which the base has been added to complete reaction, then oxidizing at a temperature in the range 200-300° F., the S,S,S-tri-n-butyl trithiophosphite thus obtained by contacting the same with air until substantially complete conversion to S,S,S-tri-n-butyl trithiophosphate has been obtained and then recovering the S,S,S-tri-n-butyl trithiophosphate thus obtained.

6. A process for the production of a trialkyl trithiophosphite of improved purity which comprises effecting a reaction between an alkyl mercaptan and a phosphorous trihalide with evolution of hydrogen halide formed in the reaction, heating the reaction mass to evolve a further quantity of hydrogen halide, then adding a base to react with residual hydrogen halide and any phospho-halide by-products in the reaction mass, then oxidizing the reaction product thus obtained and recovering a trialkyl trithiophosphate.

7. A process according to claim 6 wherein the alkyl mercaptan has 3-5 carbon atoms per molecule.

8. A process for the production of a trialkyl trithiophosphite which comprises effecting a reaction between an alkyl mercaptan and a phosphorous trihalide with evolution of hydrogen halide formed in the reaction, heating the reaction mass to evolve a further quantity of hydrogen halide, then adding a base to react with the residual hydrogen halide and any phospho-halide by-products in the reaction mass, and then recovering a trialkyl trithiophosphite thus obtained.

9. A process according to claim 8 wherein the alkyl mercaptan has 3-5 carbon atoms per molecule.

10. A process for the production of S,S,S-tri-n-butyl trithiophosphate of improved purity which comprises effecting a reaction between n-butyl mercaptan and phosphorous trichloride with evolution of hydrogen chloride formed in the reaction, heating the reaction mass to evolve a further quantity of hydrogen chloride, then adding a base in an amount in the range of 5-15 percent of the stoichiometric amount calculated according to the reaction $$3RSH+PCl_3 \rightarrow (RS)_3P+3HCl$$

to react with the residual hydrogen chloride and any phospho-chloride by-products in the reaction mass, then oxidizing the reaction product thus obtained and recovering S,S,S-tri-n-butyl trithiophosphate.

References Cited in the file of this patent

UNITED STATES PATENTS

| 1,998,106 | Titlestad | Aug. 16, 1935 |
| 2,088,814 | Schmalenbach | Aug. 3, 1937 |
| 2,114,866 | Vaughn | Apr. 19, 1938 |
| 2,358,133 | Stoesser et al. | Sept. 12, 1944 |
| 2,682,554 | Crouch et al. | June 29, 1954 |
| 2,943,107 | Rattenbury | June 28, 1960 |